United States Patent Office 3,536,660
Patented Oct. 27, 1970

3,536,660
ADDITION OF PHOSPHORUS-CONTAINING STABILIZER TO POLYMER DISPERSIONS
Edward Gibson Looker, London, Rupert Beresford Pearson, Potters Bar, and Lyle Eugene Perrins, St. Albans, England, assignors to Imperial Chemical Industries Limited, Millbank, London, England, a corporation of Great Britain
No Drawing. Continuation-in-part of application Ser. No. 484,743, Sept. 2, 1965. This application Feb. 15, 1968, Ser. No. 705,635
Claims priority, application Great Britain, Sept. 7, 1964, 36,604/64
Int. Cl. C08f *1/11, 45/58*
U.S. Cl. 260—45.7                    10 Claims

ABSTRACT OF THE DISCLOSURE

Heat stabilised compositions are made by polymerising vinyl chloride, alone or with copolymerisable monomers in an aqueous medium and adding a phosphorus-containing organic compound e.g. a phosphite to the reaction vessel after the pressure drop but before the excess of unreacted monomeric vinyl chloride is removed.

---

This application is a continuation-in-part of Ser. No. 484,743, filed Sept. 2, 1965, now abandoned.

This invention relates to polymers and in particular to a process for the manufacture of vinyl chloride polymer compositions containing stabilisers.

It is known that vinyl chloride polymers tend to decompose on exposure to heat and/or light resulting, in some cases, in a deterioration of the colour and properties of the polymers. To counteract this effect, it is widely known practice to add certain stabilisers to the polymer before subjecting it to a mixing, kneading, extrusion or moulding operation, all of which require or result in the heating of the resin. The methods generally adopted for incorporating the stabiliser usually involve mixing the powdered polymer with the stabiliser when the latter is in the form of a powder or paste followed by heating the mixture to gell the polymer into a homogeneous mass. However, it has been difficult to provide an even dispersion of the stabiliser in the polymer by these techniques and so the heat stability of the composition is not as good as could be desired.

There have been various proposals of incorporating stabilisers into vinyl chloride polymers by addition during or after polymerisation.

One important classs of compound that are known as stabilisers for vinyl chloride polymers are organic phosphorus-containing compounds see, for example, United States Pats. 3,180,847, 3,281,381 and 3,287,299.

We have found that if certain of such compounds commonly used as stabilisers are added to a vinyl chloride polymerisation reaction in more than very small quantities they stop the reaction and so, if added to the reaction mixture before initiation of polymerisation, no polymer at all is formed.

We have devised a process whereby such inhibiting phosphorus containing compounds may be incorporated into a vinyl polymer to give an even dispersion of the phosphorus-containing compounds in the polymer so that the composition has an improved heat stability compared with a mechanical blend of the polymer and stabiliser.

According to the present invention we provide a process for the production of polymeric compositions containing a vinyl chloride polymer and a heat stabiliser comprising a phosphorus-containing organic compound in which the phosphorus is present in one or more groups of the general formula

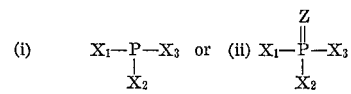

where $X_1$, $X_2$ and $X_3$ are selected from —O— or —S— atoms linking two such phosphorus-containing groups, —R, —OR, and —SR, groups where —R is a aliphatic or aromatic group free from ethylenic unsaturation and at least one of $X_1$, $X_2$ and $X_3$ being one of the —R-containing groups, and in Formula ii Z is oxygen or sulphur in which a monomeric component containing at least 50% by weight of vinyl chloride is polymerised in aqueous medium in the presence of a monomer soluble polymerisation catalyst characterised in that from 0.5 to 10% by weight, based on the weight of the monomeric component charged to the reaction vessel, of the phosphorus containing compound is added to the aqueous medium in the reaction vessel after the pressure in the reaction vessel has started to drop from the sum of the saturated vapour pressure of the water and of the monomeric component at the polymerisation temperature and while some unreacted monomeric component is still present in the reaction vessel.

In the production of vinyl chloride polymers by polymerisation of a monomeric component containing vinyl chloride in aqueous medium, the monomeric component is dispersed as droplets in the aqueous medium in the presence of a monomer soluble polymerisation catalyst and the mixture is maintained at an elevated temperature. Polymerisation takes place forming a polymer of vinyl chloride. During the polymerisation reaction the pressure in the reaction vessel is substantially constant and equal to the sum of the saturated vapour pressures of the water and of the monomeric component at the polymerisation temperature so long as unreacted liquid monomeric component is still present. As the polymerisation reaction continues the amount of liquid monomeric component present in the vessel decreases until only gaseous monomeric component and water is left in the vessel together with of course the polymer produced and the ancillary polymerisation ingredients such as catalyst and suspending agent. At this stage the vapour in the reaction vessel is no longer saturated with the monomeric component and the pressure starts to drop from the sum of the saturated vapour pressures of the water and of the monomeric component. Normally soon after this pressure drop occurs, the reaction is stopped by releasing excess unreacted monomer. It is an essential feature in the operation of the present invention that the phosphorus-containing compound is added after this pressure drop occurs and before this excess of unreacted monomer is released from the reaction vessel. If the compound is added after the excess of unreacted monomer has been released, we have found that the resulting polymer does not have the stabiliser fully and evenly and intimately dispersed therein and hence the composition has a heat stability the same as or inferior to, that of compounds made by blending the stabiliser with the polymer in the normal manner, for example by mixing the stabiliser with the polymer powder and milling at an elevated temperature.

The groups R in the phosphorus-containing compounds are aliphatic or aromatic groups free from ethylenic unsaturation and may be the same or different on each occurrence and are preferably unsubstituted. They may be hydrocarbon groups, alkyl, alkaryl, aryl, aralkyl or di- or polyvalent hydrocarbon residues, for example alkylene or arylene. The groups R may contain keto or ester linkages attached to hydrocarbon groups. Two or more groups R may together form a di- or polyvalent group, for example as in trimethyl propane phosphite, or the 2-alkoxy-1,3,2-dioxaphosphoranes i.e. compounds of the formula $$RO-P\begin{pmatrix}O\\ \\O\end{pmatrix}R$$

Said di- or polyvalent groups may be shared between two or more of the $$X_1-P-X_3 \text{ or } X_1-\overset{Z}{\underset{X_2}{\overset{\|}{P}}}-X_3$$

groups and so act as a bridge between said groups, for example, as in tri(ethylene glycol) diphosphite $$P\begin{pmatrix}O.CH_2.CH_2O\\O.CH_2.CH_2O\\O.CH_2.CH_2O\end{pmatrix}P$$

The preferred groups R each contain at least 5 carbon atoms since the stabilisers are then relatively involatile. On the other hand, those in which the groups R each contain more than 20 carbon atoms may be economically unattractive. Consequently we prefer that the groups R each contain from 5 to 20 carbon atoms. The preferred groups R are hexyl, phenyl, heptyl, octyl, isoctyl, 2-ethyl hexyl, nonyl, isodecyl, lauryl, cetyl and stearyl groups.

Phosphorus-containing compounds that are suitable for use in the present invention include:

(a) The tertiary phosphine oxides and sulphides, i.e. compounds of the formula $$R-\overset{O}{\underset{R}{\overset{\|}{P}}}-R \text{ and } R-\overset{S}{\underset{R}{\overset{\|}{P}}}-R$$

(b) The phosphonates and thiophosphonates, i.e. compounds of the formula $$R-\overset{O}{\underset{OR}{\overset{\|}{P}}}-R \quad R-\overset{O}{\underset{R}{\overset{\|}{P}}}-OR \quad R-\overset{S}{\underset{OR}{\overset{\|}{P}}}-OR \quad R-\overset{S}{\underset{R}{\overset{\|}{P}}}-OR \quad R-\overset{S}{\underset{SR}{\overset{\|}{P}}}-SR$$

and the like.

(c) The phosphonites and thiophosphonites, i.e. compounds of the formula $$R-P\begin{pmatrix}OR\\OR\end{pmatrix} \text{ or } R-P\begin{pmatrix}SR\\SR\end{pmatrix}$$

Examples of these are dihexyl p-t-butyl phenyl-phosphonite and di-p-cresyl phenyl-thiophosphonite (d) The phosphinites and thiophosphinites, i.e. compounds of the formulae $$\begin{pmatrix}R\\R\end{pmatrix}P-OR \text{ or } \begin{pmatrix}R\\R\end{pmatrix}P-SR$$

Examples of these compounds are trihexyl phosphinite $$\begin{pmatrix}C_6H_{13}\\C_6H_{13}\end{pmatrix}P-O.C_6H_{13}$$

and phenyl di-p-cresyl thiophosphinite (e) The primary phosphites and thiophosphites, i.e. compounds of the formula $$RO-P\begin{pmatrix}OR\\OR\end{pmatrix} \text{ and } RS-P\begin{pmatrix}SR\\SR\end{pmatrix}$$

Examples of these compounds include trihexyl phosphite $$C_6H_{13}O-P\begin{pmatrix}OC_6H_{13}\\OC_6H_{13}\end{pmatrix}$$

and tridodecyl trithiophosphite $$C_{12}H_{25}S-P\begin{pmatrix}SC_{12}H_{25}\\SC_{12}H_{25}\end{pmatrix}$$

(f) halohydrocarbon phosphites, i.e. phosphites in which the —R groups are halogen substituted.

An example of this type of compound is tris(3-dichloropropyl)phosphite $$Cl_2CH.CH_2.CH_2-O-\overset{O.CH_2CHCl_2}{\underset{O.CH_2.CH_2.CHCl_2}{P}}$$

and (g) polymeric phosphites of the formula $$\left[-O-R_1-O-\overset{}{\underset{OR}{\overset{}{P}}}-\right]_n \quad \left[-O-R_1-O-\overset{Z}{\underset{OR}{\overset{\|}{P}}}-\right]_n$$

$$\left[-O-R_1-O-P\begin{pmatrix}O-R_2\\O-R_3\end{pmatrix}R_4\begin{pmatrix}R_5-O\\R_6-O\end{pmatrix}P-\right]_n$$

$$\left[-O-R_1-O-\overset{Z}{\overset{\|}{P}}\begin{pmatrix}O-R_2\\O-R_3\end{pmatrix}R_4\begin{pmatrix}R_5-O\\R_6-O\end{pmatrix}\overset{Z}{\overset{\|}{P}}-\right]_n$$

$$\left[-O-R_1-O-\overset{}{\underset{OR}{\overset{}{P}}}-O-R_2-O-\overset{}{\underset{OR}{\overset{}{P}}}-\right]_n$$

and $$\left[-O-R_1-O-\overset{Z}{\underset{OR}{\overset{\|}{P}}}-O-R_2-O-\overset{Z}{\underset{OR}{\overset{\|}{P}}}-\right]_n$$

where $n$ is an integer greater than 1; $R_1$, $R_2$, $R_3$, $R_5$ and $R_6$ are divalent aliphatic or aromatic groups and $R_4$ is a quadrivalent aliphatic or aromatic group. In particular we prefer those compounds where $R_1$ is the group:

—$CH_2$—$C(CH_3)_2$—$CH_2$—$O.CO.C(CH_3)_2.CH_2$—

Examples of this type of polymeric phosphite and suitable methods for their manufacture are described in Canadian Pat. 767,674.

The preferred class of compounds is the organic phosphites, i.e. compounds having at least one group $$RO-\underset{OR}{\overset{}{P}}-OR$$

of the thio-analogues thereof.

Examples of suitable phosphites are trihexyl phosphite, triheptyl phosphite, trioctyl phosphite, tri-isooctyl phosphite, tri-2-ethyl hexyl phosphite, trinonyl phosphite, triisodecyl phosphite, tri-lauryl phosphite, tricetyl phosphite, tristearyl phosphite, triphenyl phosphite, neopentyl di-isodecyl phosphite, diphenyl 2-ethylhexyl phosphite, phenyl di(2-ethylhexyl) phosphite, di(nonylphenyl) 2-ethylhexyl phosphite, diphenyl isodecyl phosphite, di-isodecyl phenyl phosphite, di-isodecyl pentaerythritol diphosphite, 2-isodecyloxy-5,5-diisodecyl-1,3,2-dioxaphosphorane and tris(nonylphenyl) phosphite.

The amount of phosphorus-containing organic compound added to the reaction vessel is from the order of 0.1 to 10% by weight of the monomeric component charged to the reaction vessel and is preferably in the range 0.5 to 3% by weight.

Other ingredients including lubricants and additional stabilisers, for example lead stearate, dibasic lead stearate, calcium stearate, cadmium stearate and cadmium laurate, and waxes may be incorporated in the mixture and may in many cases be added to the mixture at the same time as or before the phosphorus-containing compound. Alternatively, the addition additives may be compounded with the polymer in the normal manner and also pigments such as titanium dioxide and carbon black may be added.

Other ingredients that may be added either to the dispersion of the resulting polymer include processing aids such as methyl methacrylate/ethyl acrylate copolymers; styrene/acrylonitrile copolymers, chlorinated polyethylene; and impact strength improving agents such as calcium carbonate, preferably coated with a fatty acid such as stearic acid; acrylonitrile/butadiene/styrene copolymers and ethylene/vinyl acetate copolymers.

Plasticisers may also be added to the polymer if a plasticised product is required.

Monomers that may be copolymerised with vinyl chloride and hence may form part of the monomeric component include vinyl esters such as vinyl acetate; vinylidene chloride; alkyl esters of unsaturated mono- or dicarboxylic acids such as acrylic acid, methacrylic acid, maleic acid and fumaric acid, in particular the methyl and ethyl esters of such acids; acrylonitrile; methacrylonitrile; and maleic anhydride. The total amount of co-monomers used may be up to 50% by weight of the weight of the monomeric component and is preferably less than 20% by weight of the weight of the monomeric component.

Suitable polymerisation catalysts include the monomer soluble peroxy compounds such as the acyl peroxides such as benzoyl peroxide and lauroyl peroxide, peroxydicarbonates and azo compounds such as diazoaminobenzene, $\alpha,\alpha'$ - azodiisobutyronitrile, $\alpha,\alpha'$ - azodibutyric acid esters, as, for example, the corresponding methyl, ethyl or butyl esters, $\alpha,\alpha'$-azodi-$\alpha$-$\gamma$-dimethyl valeronitrile and $\alpha,\alpha'$-azodicyclohexane carbonitrile. Mixtures of catalysts may also be used. The quantity of catalyst used will depend on the nature of the catalyst and polymerisation temperature but in general will be in the range 0.005 to 2% by weight of the polymerisable monomeric component.

Dispersing agents may be added to the polymerisation mixture if desired.

Dispersing agents, if used, are generally protective colloids such as gealtin, methyl cellulose and completely or partially hydrolysed polyvinyl acetates.

The quantities of dispersing agent, if used, are those normally encountered in vinyl chlorine polymerisation, for example 0.01 to 5%, preferably 0.04 to 1%, by weight of the monomeric component.

The compositions made according to the process of the invention are particularly useful for making rod, tubing and other profiles by extrusion processes.

The invention is illustrated but in no way limited by the following examples in which all parts and percentages are expressed by weight.

EXAMPLE I 2000 parts of distilled water, 1.4 parts of hydrlysed polyvinyl acetate and 0.35 part of diisopropyl peroxydicarbonate were added to a stainless steel autoclave. The autoclave was stirred continuously and evacuated, then purged with nitrogen and again evacuated. 1000 parts of vinyl chloride were added and the autoclave maintained at a temperature of 65° C. During the polymerisation reaction the pressure was approximately constant at about 150 p.s.i.g. but after 2½ hours started to fall. When the autoclave pressure had fallen to 90 p.s.i.g. a solution of 6 parts of triisodecyl phosphite dissolved in 40 parts of ethylene dichloride was injected. The mixture was stirred for a further half hour and then the autoclave was vented to the atmosphere. The polymer was filtered from the aqueous medium and then dried in an oven at 50° C. for 24 hours. The yield of polymer was 728 parts and analysis showed it contained 0.9% of tri-isodecyl phosphate which corresponds to about 100% retention.

The polymer, with no other additives, was then converted to a crêpe by milling for 5 minutes on a two roll mill, one roll of which was maintained at 160° C., the other roll at 170° C. The crêpe was clear and yellow-orange in colour.

By comparison a polymer was made by the above process with the omission of the addition of tri-isodecyl phosphite. 0.85 part of tri-isodecyl phosphite was added to 100 parts of the dried polymer powder and the mixture milled as above to produce a clear crêpe of a deep orange colour.

EXAMPLE II

The procedure of Example I was repeated but replacing the solution of tri-isodecyl phosphite in ethylene dichloride by a solution of 16 parts of tris (nonyl phenyl) phsophite in 20 parts of chloroform. This solution was injected after 4 hours polymerisation time when the pressure in the autoclave had fallen to 72 p.s.i.g. The yield of polymer was 740 parts and contained 0.5% of tris(nonyl phenyl) phosphite corresponding to a retention of 23%.

A control polymerisation was also conducted but omitting the tris(nonyl phenyl) phosphite injection. The reaction time was 4 hours. 100 parts of the polymer from this latter polymerisation was milled on a two roll mill as in Example I for 5 minutes with a further 2.2 parts of tris(nonyl phenyl) phosphite. The resulting crêpe was compared with a crêpe prepared by milling the polymer made by the process in which tris(nonyl phenyl) phosphite was injected into the autoclave. The latter crêpe was a light red brown colour whereas that made from the polymer in which no tris(nonyl phenyl) phosphite was injected after the pressure drop was a dark brown colour.

Samples of the two sheets were pressed into ⅛ inch thick sheets by heating at 190° C. for 2 minutes. The sheet made from the crêpe of the polymer made by the process in which tris(nonyl phenyl) phosphite injection was black and opaque.

EXAMPLE III

The procedure of Example I was repeated but using a solution of 7.5 parts of a polymeric phosphite in 30 parts of chloroform in place of the solution of triisodecyl phosphite.

The polymeric phosphite had the structure

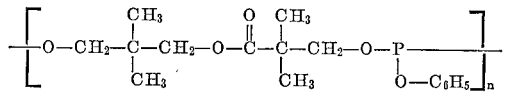

and was made by transesterification of 2,2-dimethyl-3-hydroxy propyl-2,2-dimethyl-3-hydroxy propionate with triphenyl phosphite by the method described in Example 1 of Canadian Pat. 767,674.

This solution was injected after 3½ hours when the pressure had fallen to 90 p.s.i.g. The yield of polymer was 815 parts and analysis showed it contained about 0.9% of the polymeric phosphite which corresponds to about 98% retention.

A control polymerisation was also conducted but omitting the injection of the polymeric phosphite. The reaction time was 4¼ hours and 100 parts of the polymer was milled, as in Example I with 0.9 part of the polymeric phosphite. The resulting crêpe was compared with a crêpe prepared by milling the polymer made by the process in which the polymeric phosphite was injected into the autoclave. The latter crêpe was yellow in colour whereas that made from the polymer in which no polymeric phosphite was injected after the pressure drop was brown in colour.

EXAMPLE IV

This example shows that both tri-isodecyl phosphite and tris(nonyl phenyl) phosphite inhibit polymerisation of vinyl chloride.

The polymerisation recipe of Example I was used and the solution of tri-isodecyl phosphite in ethylene dichloride as used in Example I, and in another polymerisation, the solution of tris(nonyl phenyl) phosphite in chloroform as used in Example II was added before the vinyl chloride.

In neither polymerisation was any polymer formed after 6 hours at 65° C.

EXAMPLE V

This example shows that the polymeric phosphite used in Example III inhibits polymerisation of vinyl chloride. The polymerisation recipe of Example I was used and the solution of the polymeric phosphite in chloroform as used in Example III was added to the reaction vessel before the vinyl chloride. Even after 24 hours at 65° C. no polymer was formed.

EXAMPLE VI

This example shows that it is essential to add the phosphorus-containing compound before the excess monomer is removed.

The polymerisation procedure of Example I was used save that no tri-isodecyl phosphite was added. The excess monomer was vented from the autoclave and in separate experiments 1, 2 and 4% of tri-isodecyl phosphite, based on the weight of the polymer, were added to the slurry of polymer and water. The slurry was stirred at 50° C. and samples taken after 1, 3 and 16 hours stirring. The heat stability of the sample was estimated by filtering and drying the polymer and milling, without any additional additives as in Example I. The heat stability of the polymer was no better than that of polyvinyl chloride to which no tri-isodecyl phosphite was added, even with the samples taken after 16 hours stirring.

The addition of 1%, based on the weight of the polymer, of chloroform or ethylene dichloride to the slurry in addition to the tri-isodecyl phosphite also gave no improvement over unstabilised polyvinyl chloride.

We claim:
1. A process for the production of polymeric compositions containing a vinyl chloride polymer and a heat stabilizer comprising a phosphorus-containing organic compound in which the phosphorus is present in one or more groups of the general formula:

(i) 

or (ii) 

where $X_1$, $X_2$ and $X_3$ are selected from —O— or —S— atoms linking two such phosphorus-containing groups, —R, —OR, and —SR groups where —R is an aliphatic or aromatic group that is free from ethylenic unsaturation, at least one of $X_1$, $X_2$ and $X_3$ being one of the —R containing groups; and in Formula ii Z is oxygen or sulphur in which a monomeric component containing at least 50% by weight of vinyl chloride is polymerized alone or in the presence of a minor amount of one or more ethylenically unsaturated monomers in aqueous medium in a reaction vessel in the presence of a monomer soluble polymerization catalyst characterized in that from 0.5 to 10% by weight, based on the weight of the monomeric component charged to the reaction vessel, of the phosphorus-containing compound is added to the aqueous medium in the reaction vessel after the pressure in the reaction vessel has started to drop from the sum of the saturated vapour pressure of the water and of the monomeric component at the polymerization temperature and while some unreacted monomeric component is still present in the reaction vessel to obtain a mixture of unreacted monomer, polymer and phosphorous-containing compound in water, venting the unreacted monomer and recovering and drying the polymer.

2. A process as claimed in claim 1 in which the groups R in the phosphorus-containing compound each contain from 5 to 20 carbon atoms.

3. A process as claimed in claim 1 in which the phosphorus-containing compound is a phosphite of the formula

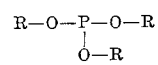

4. A process as claimed in claim 3 in which all the groups R are the same.

5. A process as claimed in claim 4 in which the phosphorus-containing compound is tri-isodecyl phosphite.

6. A process as claimed in claim 4 in which the phosphorus-containing compound is tris(nonyl phenyl) phosphite.

7. A process as claimed in claim 1 in which the phosphorus-containing compound is a polymeric phosphite of the formula

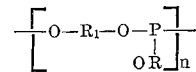

where $R_1$ is an aliphatic or aromatic group that is free from ethylenic unsaturation and $n$ is greater than 1.

8. A process as claimed in claim 7 in which the group $R_1$ is the group:

—$CH_2$.C($CH_3$)$_2$.$CH_2$.O.CO.C($CH_3$)$_2$.$CH_2$—

9. A process as claimed in claim 1 in which the amount of the phosphorus-containing compound added to the aqueous medium in the reaction vessel is in the range of from 0.5 to 3% by weight, based on the weight of the monomeric component charged to the reaction vessel.

10. In a process for the production of a heat stabilized polymeric composition containing a vinyl chloride polymer and a heat stabilizer comprising a phosphorous-containing organic compound in which the phosphorus is present in one or more groups of the general formula:

(i) 

or (ii) 

where $X_1$, $X_2$ and $X_3$ are selected from —O— or —S— atoms linking two such phosphorus-containing groups, —R, —OR, and —SR, groups where —R is an aliphatic or aromatic group free from ethylenic unsaturation and at least one of $X_1$, $X_2$ and $X_3$ being one of the —R containing groups, and in Formula ii Z is oxygen or sulphur wherein a monomeric component containing at least 50% by weight of vinyl chloride is polymerized alone or in the presence of a minor amount of one or more ethylenically unsaturated monomers in aqueous medium in a reaction vessel in the presence of a monomer soluble polymerization catalyst, and excess monomer is vented from the vessel after the pressure in the reaction vessel has started to drop from the sum of the saturated vapour pressure of water and of the monomeric component at the polymerization temperature and the polymer is thereafter recovered, the improvement whereby enhanced heat stability is obtained which comprises adding from 0.5 to 10% by weight, based on the weight of the monomeric component charged to the reaction vessel, of the phosphorus containing compound, after the pressure starts to drop but before the excess monomer is vented.

References Cited

UNITED STATES PATENTS

| | | | |
|---|---|---|---|
| 2,906,719 | 9/1959 | Jankowiak et al. | 260—23 |
| 3,026,308 | 3/1962 | Kearney | 260—92.8 |
| 3,054,786 | 9/1962 | Burkholder et al. | 260—92.8 |
| 3,281,381 | 10/1966 | Hechenbleikner et al. | 260—23 |
| 3,373,150 | 3/1968 | Pears et al. | 260—92.8 |
| 3,442,982 | 5/1969 | Friedman | 260—927 |

DONALD E. CZAJA, Primary Examiner

R. A. WHITE, Assistant Examiner

U.S. Cl. X.R.

260—23, 45.85, 85.5, 86.3, 87.1, 92.8